G. H. LITTLE.

Injector.

No. 8,104. Reissued Feb. 26, 1878.

WITNESSES:

Jas. E. Hutchinson.

Pennington Halsted

INVENTOR.

George H. Little by John J. Halsted his Atty.

N. PETERS, PHOTO-LITHOGRAPHER, WASHINGTON, D. C.

UNITED STATES PATENT OFFICE.

GEORGE H. LITTLE, OF PEABODY, MASSACHUSETTS.

IMPROVEMENT IN INJECTORS.

Specification forming part of Letters Patent No. 165,843, dated July 20, 1875; Reissue No. 8,104, dated February 26, 1878; application filed June 30, 1876.

*To all whom it may concern:*

Be it known that I, GEORGE H. LITTLE, of Peabody, in the county of Essex and State of Massachusetts, have invented an Improvement in Injectors or Jet-Pumps; and I do hereby declare that the following, taken in connection with the drawings which accompany and form part of this specification, is a description of my invention sufficient to enable those skilled in the art to practice it.

My improvement relates to apparatus to be worked by a current of steam, or of compressed air or liquids, to create a vacuum and raise liquids, in connection with other apparatus to feed the water or liquids so raised and started into boilers or tanks, or to introduce air or steam, or air and steam, or exhaust-steam, into steam-pipes for increasing the power of the engine.

The present improvement consists in a means for passing currents of steam at two different places in the apparatus, the one being for creating a vacuum and drawing the water at the start and the other for forcing the same after such drawing, and in certain modifications thereof, and in details hereinafter set forth.

Figure 1:
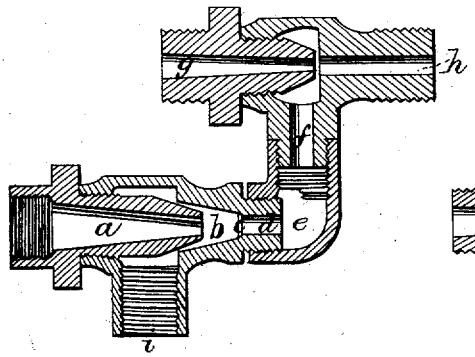
Figure 2:
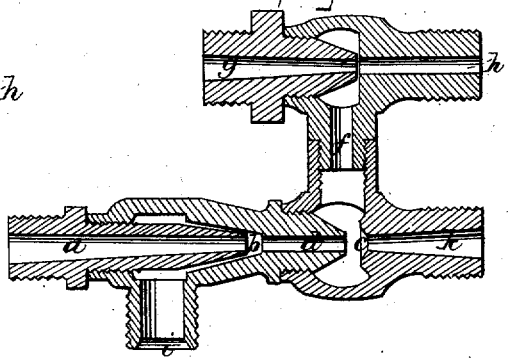
Figure 3:
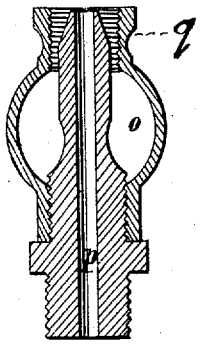

Figure 1 represents an apparatus embodying my invention as adapted for using two currents of steam, but through one outlet, and designed for raising water to a great height to supply tanks, &c. Fig. 2 represents the invention as adapted for admitting two currents of steam, one for creating a vacuum and the other for throwing the water against pressure, whether of pressure in feeding a boiler or of pressure in supplying a tank at a considerable height. Fig. 3 is a priming-chamber.

In the drawing, (see Fig. 1,) *a* is the main steam-inlet tube for passing the current of steam, having, as seen, a tip tapering on its exterior, and preferably a tapering bore. *b* is a tapering portion of an outer tube, and *c* a second tapering or funnel-shaped opening at the junction of *b* with the passage *d*, the latter discharging into an elbow, *e*. Upon the top of this elbow is attached by a screw-thread the auxiliary or drafting apparatus *f g h*, in which *f* represents the suction or water-inlet; *g*, the tapering inlet for the steam-current, having also a tapering exterior at its tip; and the straight tube *h* the only discharge or outlet, and through which all the water passes. The diameter of the bore of the tube *h* is designedly made larger than the smaller end of the tube *g*, in order to exhaust the air from *f*, and to allow the exhausted air commingled with the steam to pass through; and I avoid any flaring or bell-shaped mouth at either end of the tube *h*, such as has been used before, and may be seen in Friedmann's pump, patented April 6, 1869, No. 88,620.

Appropriate pipes, valves, or cocks may be used to connect the parts *a* and *g*, so that the steam may be admitted to one or both at the same time; and appropriate threads and adjusting-nuts may be used to admit of changing the positions of the parts *a*, *b*, *g*, and *h*, to graduate the admission of water and facilitate the operation, provided I should desire to throw a great quantity of water; but for the purpose of creating a vacuum, the parts, being first placed in position, require no adjustment. The part *f* being screwed into the elbow *e*, the apparatus is then ready for use, the steam-currents entering both at *a* and *g*, and the water at *i*, and passing through *f*.

At the commencement of the operation (the entrance of steam at *a* being first cut off by an appropriate cock) the steam, passing in at *g*, will, by reason of its creating a vacuum as it passes through *g* and *h*, lift water up through *i f h* until the water is properly lifted, after which the steam-current is admitted at *a* and cut off at *g*, and the course of the steam and water will be through *d h*, and the supply of water kept up without the further use of the auxiliary steam-current inlet *g*. But both *a* and *g*, if desired, may now be used together, the effect of such joint use being to increase the power of forcing or driving the water.

The tubes *a* and *g* may exchange places, and each then perform the duty previously assigned to the other, so that either may be used for lifting or for forcing, at option.

In Fig. 2 there are two outlets, viz., *h* and *k*, *h* being the outlet of the auxiliary steam-tube for starting the water until it is properly drafted, and *k* being the outlet leading to the boiler or tank, to supply either of these vessels, as the case may be, after the water has been sufficiently drafted to keep up the supply through the agency of the steam-current passing in at *a* only, and after this stage, the steam supply at *g* being cut off, the current or route of the water will be only through *i d k*, and no longer through *i d f h*. The exit-mouth of *d* and the inlet-mouth of *k* may be of the same size.

The priming-chamber shown in Fig. 3 is to be attached, when desired, to the water-inlet at *i* in either of the described modifications, either directly or by a connecting-nipple. As will be seen, it consists of an annular chamber, *o*, surrounding the water-inlet passage *p*, and permits a supply or priming of water to be always ready in the chamber *o*, and in near proximity to the current of steam passing through the injector, so as to be ready for prompt use in starting the apparatus.

The tube *p* is made adjustable within its casing or annular chamber *o*, and therefore its tip or extremity may be raised or lowered, and consequently adjusted, as may be desired or required; and the level or height of the water in the chamber *o* may be made to rise as high as the exit-tip of pipe *p*, or lower, as may be desired, to facilitate the ready action of this priming-chamber. The suction-tube *p*, by reason of its being adjustable in the priming-chamber *o*, serves also as a means for varying and regulating the quantity of water which may be received into or delivered from said chamber.

The chamber *o* is adapted to be secured directly to the water-inlet of the injector, and the suction-tube *p* is adapted to be screwed to and within this chamber, the diameter of the tube permitting it to reach up into the neck *q* of the chamber.

It will be seen that I avail myself of the advantage due both to the priming-chamber and to the auxiliary steam-tube, both serving to start the supply of water. The auxiliary steam-tube *f g h*, by forcing air into a steam-pipe or exhaust-steam into steam pipes, tank, or cylinder, serves to increase the power of the engine, the air in the one case becoming suddenly expanded to a great degree by the heat of the steam, and thereby adding a great increase of power without adding to the expense; and the exhaust-steam, in the other case, being, by reason of the vacuum, drawn away from the cylinder, relieves the piston of the engine of back pressure, and to that extent increases the efficiency of the engine.

The application to an injector of the parts *f g h*, comprising an ejector, and the forming of a vacuum by a current of steam to draw exhaust-steam into a pipe, tank, or cylinder, I deem very essential and important features of my invention.

The ejector, while serving to draw water through the injector, at the same time acts as an overflow.

I do not, in using the auxiliary parts *g f h*, confine myself to the peculiar construction of injector herein shown and described, as they are applicable to all injectors designed to lift water.

I claim—

1. An ejector, *g f h*, constructed as shown, with the bore *h* of a uniform larger diameter than the outlet of the tapering bore *g*, for raising water.

2. In combination with an injector, an ejector, *g f h*, constructed as shown, with the bore *h* of a uniform larger diameter than the outlet of the tapering bore *g*, and attached to the overflow of the injector, as shown, to raise water for the injector.

3. An ejector carrying a solid jet of steam for lifting, and so arranged in relation to the overflow and steam-jet of an injector as to aid the injector in forcing water.

4. An ejector carrying a solid jet of steam, attached to an injector carrying a solid jet of steam, each complete in itself, and capable of being worked independently or together.

5. In combination, the steam-tube for forcing water, the auxiliary tube for drawing water at starting, and the priming-chamber *o*, all substantially as shown, and for the purpose described.

6. The priming-chamber *o*, constructed and applied to the injector, substantially as shown and set forth.

7. A priming-chamber, *o*, applied as set forth, in combination with the suction-tube, and whereby a space is provided around said tube for holding or receiving water for an injector.

8. The adjustable suction-tube *p*, in combination with and projecting into and within the priming-chamber, for the purpose of varying the quantity of water which may be received into and delivered from said chamber.

9. In a combined injector and ejector, the tubes *a* and *g*, interchangeable one with the other, whereby the lifting-tube may be used as the forcing-tube, and vice versa.

GEORGE H. LITTLE.

Witnesses:

G. F. OSGOOD,

H. H. CAMPBELL.